N. P. Lindergreen,
Fruit Can.
No. 3299. Fig. 1 Reissued Feb. 16. 1869.
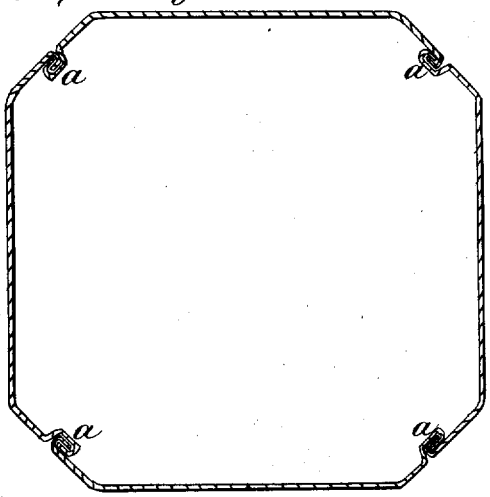
Fig. 2
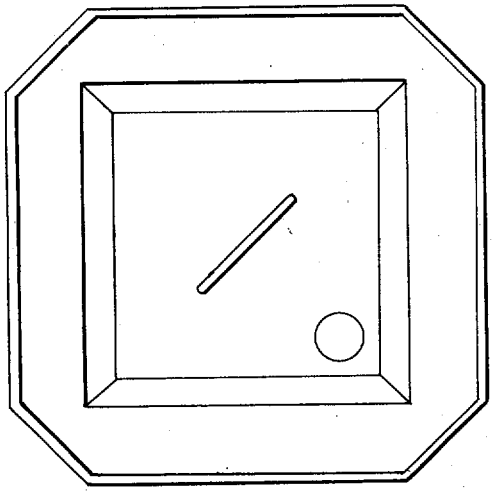
Fig. 3
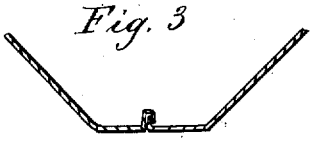
Witnesses
Alex F. Roberts
G. C. Cotton.
Inventor
N. P. Lindergreen.
per Munn & Co
attorneys
N. PETERS, PHOTO-LITHOGRAPHER, WASHINGTON, D. C.

UNITED STATES PATENT OFFICE.

N. P. LINDERGREEN, OF BOSTON, MASSACHUSETTS.

IMPROVEMENT IN PACKING-CANS.

Specification forming part of Letters Patent No. 83,070, dated October 13, 1868; Reissue No. 3,299, dated February 16, 1869.

*To all whom it may concern:*

Be it known that I, NILS P. LINDERGREEN, of Boston, in the county of Suffolk and State of Massachusetts, have invented a new and useful Improvement in Packing-Cans; and I do hereby declare that the following is a full and exact description thereof, reference being had to the accompanying drawings, and the letters of reference marked thereon.

In the accompanying drawings, Figure 1 is a top view of the body of the can before the top is put on. Fig. 2 is a view of the top or cover of the can. Fig. 3 is a detached view of a different form of joint from those in Fig. 1.

My invention consists of an octagon tin can having four wide and four narrow sides, the sheet metal being joined or soldered together in the short side or sides, for the purpose of protecting the seam or joint from wear or injury in packing or transportation.

In the construction of cans of ordinary size I take four sheets of tin, and bend the same properly, and then join them together by seams, (*a*, Fig. 1,) to form the octagon body or sides of the can. Then the top and bottom, being also properly bent in a suitable manner, are soldered to the octagon body, or dipped in melted solder in the usual way, thus completing the can with six sheets or pieces of tin-plate.

Small cans may be made of one sheet of metal, properly bent before soldering together. Therefore I use one or more sheets of tin, according to the size of can desired, always making my cans of the octagon form, and making the joint in the short side or sides of the body.

In the above-described construction of cans the seam or joint is in the stiffest part of the body of the can, and where it is not liable to injury from either internal or external pressure, and in packing such cans together in a large box, the joints of the body of the can are entirely out of the way of wear or contact from the box or cans themselves. Therefore my octagon cans are better than common square cans with joints at the corners or sides.

Having thus fully described my invention, what I claim, and desire to secure by Letters Patent of the United States, is—

An octagon tin can having four wide and four narrow sides, the joint of the sheet metal being in the narrow side or sides of the body of the can, substantially as set forth.

The above specification of my invention signed by me this 22d day of October, 1868.

N. P. LINDERGREEN.

Witnesses:
WM. P. EMERSON,
THOMAS SHAW.